Figure 1:
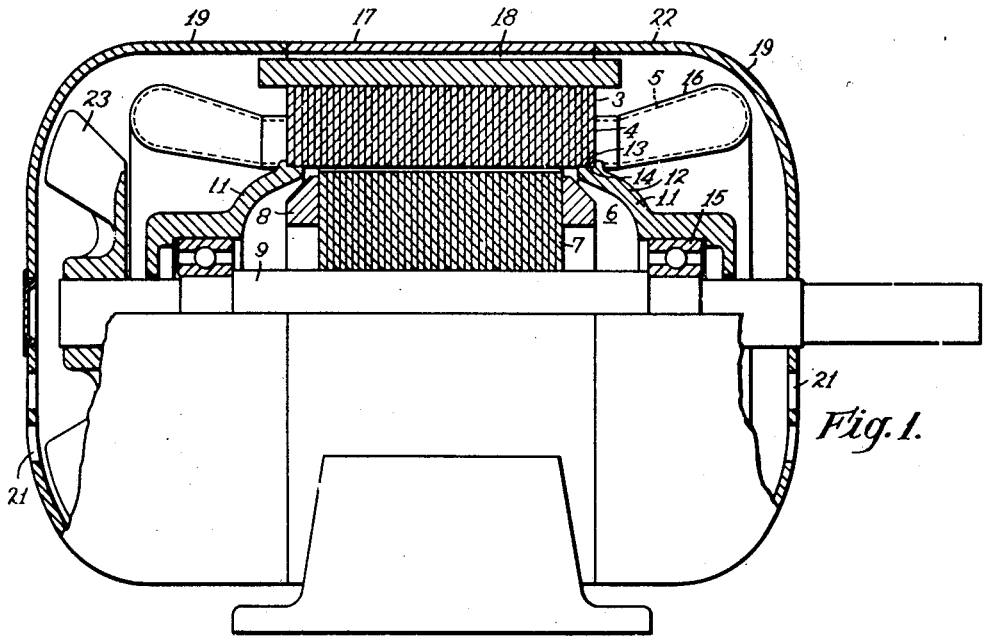

Feb. 22, 1949.  L. R. LUDWIG  2,462,204
ELECTRIC MOTOR WITH BORE-CENTERED BEARINGS
Filed March 20, 1947

WITNESSES:
Edward Michaels
Wm. L. Groome

INVENTOR
Leon R. Ludwig.
BY O.B. Buchanan
ATTORNEY

Patented Feb. 22, 1949

2,462,204

UNITED STATES PATENT OFFICE 2,462,204

ELECTRIC MOTOR WITH BORE-CENTERED BEARINGS

Leon R. Ludwig, Buffalo, N. Y., assignor to Westinghouse Electric Corporation, East Pittsburgh, Pa., a corporation of Pennsylvania Application March 20, 1947, Serial No. 735,837

8 Claims. (Cl. 172—36)

My invention relates to improvements in dynamo-electric machines in which the bearing-supported brackets are centered in the bore of the stator. My invention is particularly applicable, although not altogether limited, to commercial squirrel-cage motors, these motors being characterized by the existence of a limiting design-factor which is found in the temperature-rise which occurrs in the primary or stator-windings.

More particularly, my invention relates to that type of motor which is protected against the entrance of dirt, chips, and foreign matter from the atmosphere surrounding the motor. Heretofore, the demand for this type of protected motor has been met by supplying either a so-called totally enclosed non-ventilated motor or a totally enclosed fan-cooled motor. In both of these previously known motors, the windings and the airgap are protected by means of enclosing brackets or shields which enclose the entire electrical structures of the machines, including the stator-windings as well as the airgap and the entire rotor member. If the motor dissipates heat only by radiation from its total-enclosure member to the surrounding atmosphere, it is a totally enclosed non-ventilated machine, but if it has a fan, outside of the enclosing members, arranged to force air over the structure, the motor is a totally enclosed fan-cooled motor.

In either of these two types of totally enclosed machines, as known in the prior art, there is considerable difficulty in obtaining a satisfactory heat-transfer between the stator-windings and the enclosing structure, because the heat of the windings is transferred largely through the insulation of the end-turns of the winding, and thence to the air within the enclosure of the machine, and thence again to the end-brackets of the enclosure, and thence to the ambient air surrounding the machine. At each boundary-condition, there is a decided temperature-differential or thermal drop, and the large number of serially-connected boundary-conditions result in a large total temperature-difference between the primary windings and the external air.

In the common forms of previously known machines, also, the bearing-supporting brackets have extended out to the outside diameter of the frame of the machine. This form of construction has caused considerable difficulty in getting the bearings properly centered with respect to the bore of the stator-core, so much so that non-centrally located rotors have been one of the most important factory-troubles in the process of manufacturing motors. When the brackets are of light weight, troubles are encountered by reason of the distortion of the brackets by means of the pressure exerted by chucks in the boring machines, or otherwise during the process of manufacture. Troubles have been experienced in maintaining a proper centering relationship between the bore of the stator-core and the radial-register surfaces of the stator-frame.

It is a principal object of my present invention to at once obviate or alleviate both of these difficulties of the prior art, by utilizing small machine-enclosing bearing-supporting brackets which are centered in the stator airgap-bore, so that the bracket encloses the airgap of the machine and the entire rotor-member of the machine, but not the end-turns of the stator-winding. The bearings are thus directly centered with respect to the stator-bore, which is what is ultimately desired, and the stator-windings are cooled by a direct heat-transfer from the end-turns directly to the outside atmosphere, thus involving only one boundary-condition in the heat-transfer path.

Figure 2:
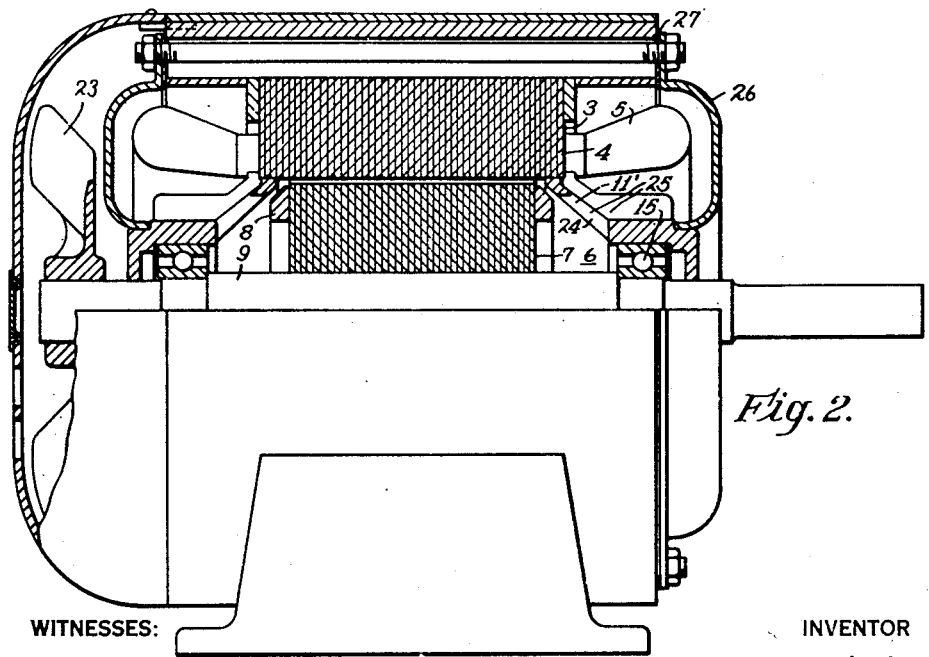

With the foregoing and other objects in view, my invention consists in the systems, constructions, combinations, parts, and cooling and centering means and methods hereinafter described and claimed, and illustrated in the accompanying drawing, wherein the two figures are longitudinal sectional views, partly in side elevation, illustrating two different forms of embodiment of my invention, Figure 1 illustrating a form of embodiment in which a protective encapsulating casing is preferably used on the end-turns at each end of the machine, while Fig. 2 shows a form of embodiment in which a special shield is utilized for protecting these end-turns.

In the preferred form of embodiment of my machine, which is shown in Fig. 1, I provide a stator core-member 3 having a cylindrical airgap-bore 4, and stator-windings having end-turns 5 extending out of each end of the stator core-member in closely spaced relation to the bore. The stator-windings are the primary windings of a squirrel-cage induction-motor, usually three-phase, and commonly having a rating in the range between five horsepower and seventy-five horsepower, more or less. I also provide a rotor-member 6, which is shown as comprising a cylindrical laminated rotor core-member 7, having an integrally cast squirrel-cake winding 8 thereon, usually of aluminum. The rotor-member also comprises a shaft 9, which supports the rotor-core 7.

In accordance with the preferred embodiment of my invention which is shown in Fig. 1, the stator core-member 3 has an axial length which is sufficient to extend axially beyond the airgap portion of the rotor-member 6, at each end of the machine. I also provide a bore-centered shaft-supporting bearing-bracket 11 at each end of the machine. Each bracket 11 is preferably imperforate, in the sense of having no ventilating-openings therein, so that it serves as a part of the machine-enclosure, providing the equivalent of the previously known types of totally enclosed machines. Each bracket 11 has an inwardly extending, peripherally disposed structural-means 12 having a centering abutment 13 with its end of the stator-bore 4, and having an axial-displacement-preventing abutment 14 with its end of the stator core-members 3, between said bore 4 and the stator end-turns 5 at its end of the machine. Preferably, the centering abutment 13 of each bracket 11 makes a continuous, substantially airtight, engagement with its end of the stator core-member 3, at or adjacent to the airgap-bore 4, so that the bracket 11 encloses the airgap of the machine, and encloses the rotor-member 6, but does not enclose the stator-windings 5. Each bracket 11 carries a centrally disposed shaft-supporting bearing 15.

The end-turns 5 of the stator-windings, at each end of the machine, are preferably provided with a protective encapsulating casing, 16, which is substantially limited to the surface-extent of said stator end-turns, and which tightly encloses said stator end-turns. The encapsulating material is of a nature which will protect the windings against dirt, moisture, oil and the like, and which will provide a thermal conductivity high enough to allow the heat of the windings to be transmitted without an excessive thermal drop.

In the usual case, it is preferable to have some sort of cooling-means, for facilitating the removal of heat from the end-turns 5 of the primary windings. This is all the more necessary because the machine is of a totally enclosed type, which means that the iron parts of the machine, that is, the stator and rotor cores 3 and 7, usually run at a higher temperature than is desirable for either the copper of the primary windings or the insulation thereof. A high copper-temperature is undesirable because of the greatly increased resistance which is thereby obtained, necessitating the utilization of more primary-winding copper in the machine. A high copper-temperature also necessitates the utilization of an insulating material which is able to stand the high copper-temperature, which usually means a more costly material than a low-temperature insulating material.

In the preferred form of embodiment of my invention, as shown in Fig. 1, the stator-member of the machine also includes a frame-member 17, which is supported in spaced relation to at least portions of the outer periphery of the stator core-member 3, so as to provide an axially extending ventilating-space 18 surrounding the stator-core-member 3. At each end of the machine, I also provide a hood, or hoodlike shield 19, which is provided with ventilating-openings 21, preferably provided only in the lower half or hemisphere of each hood. Each hood 19 has a substantially cylindrically extending peripheral portion 22, which is secured in engagement with its end of the frame-member 17. These two hoods 19 are disposed in spaced relation to the end-turns 5, so as to enclose and protect said end-turns. The hoods 19 also give the machine a good finished appearance. The ventilating-means is completed by an external fan 23, which is carried by the shaft 9, between one of the end-brackets 11 and the hood 19 at that end of the machine. There could be two fans 23, one at each end of the machine, making a double-fan-ventilated machine, but I prefer to utilize a single-fan-ventilated machine, with only one fan 23, as shown in Fig. 1.

Totally enclosed, fan-cooled machines have been known before, utilizing an external fan and two hoods, similiar to my fan 23 and hoods 19, for causing cooling air to flow over the entire machine-enclosure, but these machines have been totally enclosed in the sense of having their bearing-supporting, machine-enclosing brackets making engagement with the outer periphery of the stator core-member, so as to totally enclose the primary windings, as well as the airgap and the rotor of the machine. In all such previously known, fan-cooled, totally enclosed machines, the external air, which was delivered by the external fan, would cool only the outer periphery of the stator core-member and the two end-brackets of the machine. The heat which is generated in the primary windings would have to be dissipated, partly by heat-transfer from the slot-lying portions of the windings, through the winding-insulation, directly into the stator-core, and thence radially to its outer periphery and to the stream of external cooling-air, while another portion of the heat of the primary windings would be dissipated from the end-turns, passing first through the end-turn insulation to the internal air which is enclosed in the machine, and being carried by this internal air and transferred to the totally enclosing brackets at the ends of the machine, and passing through these brackets and finally being transferred to the external air-blast which flows over the brackets, between the brackets and the two hoods at the respective ends of the machine.

In the operation of my invention, as shown in Fig. 1, the heat-transfer is unique, in any totally enclosed type of machine, that is, in any machine which is totally enclosed in the sense of having the airgap and the rotor totally enclosed, these being the principal parts which need to be protected against external-air-borne dirt, chips, and other foreign matter, this protection being needed because of the necessity of utilizing an airgap which is as short as can be mechanically maintained, under commercial conditions of manufacture and maintenance, a short airgap being needed in order to maintain the necessary high performance-standards of commercial induction-motors. The uniqueness of the heat-transfer method of my invention, as shown in Fig. 1, lies principally in the fact that the fan-driven external air comes into direct contact with the insulated or encapsulated end-turns 5 of the primary winding, so that the heat-transfer is directly from the copper, through its covering insulation, to the blast of external air, thus providing a single thermal drop or temperature-gradient between the copper and the external air, which is quite new in any dynamo-electric machine in which the airgap and the rotor are totally enclosed.

In my invention, the provision of bore-centered brackets 11 is novel and doubly advantageous from a mechanical standpoint, in addition to its advantage in the matter of heat-transfer from the stator-copper to the external air. The centering of the bearing-supporting brackets 11 within the stator-bore 4 serves to accurately and directly center the bearings 15 with respect to the stator-bore 4, thus greatly reducing the manufacturing difficulties in accurately centering the rotor-member 6 so that it will have a reasonably uniform airgap, but at the same time an extremely small airgap, between the rotor-member and the stator-bore 4. This is in sharp contrast with the previous centering-problems, which have involved large end-brackets extending all the way around the stator end-turns and making a centering-engagement with the rear or outer portion of the stator-core or the stator-frame, and also involving a second centering operation for centering the bracket-engaging frame-portion with respect to the stator-bore.

In addition, my new brackets 11 are much smaller than the old ones, which extended out to the outer diameter of the frame, resulting in a smaller weight, and a much less costly bracket to make.

The hoods 19, at the two ends of the motor, protect the windings 5 and the fan 23, from objects falling on them, and also protect the users of the motor from being harmed by the fan. The hood 19 at the motor-end which does not have a fan is also useful in directing the blast of external air downwardly around the end-turns 5 at that end of the machine, and also down around the bearings 15 at that end of the machine, so as to avoid bearing-troubles due to overheated lubricants.

In Fig. 2, I have shown an alternative form of embodiment of my invention, which is totally enclosed in the old sense of enclosing the stator-windings as well as the airgap and the rotor, but which features the bore-centered bracket of my invention. Since the stator-winding end-turns are totally enclosed, in Fig. 2, they do not need to be provided with the special encapsulating casing 16 which is preferably utilized in Fig. 1.

In Fig. 2, the stator and rotor members are the same as in Fig. 1, except for the omission of the encapsulating casing 16 in Fig. 2, but the bore-centered bearing-carrying brackets 11 are shown, in Fig. 2, as perforated brackets 11', which are provided with ventilating-openings 24, which are preferably provided by means of a spider-like construction including a plurality of bracket-arms 25, which are separated by said openings 24.

In Fig. 2, instead of encapsulating the end-windings 5, I enclose them by means of two protective shields 26, which provide a sealing-enclosure extending from the bearing 15 to the outer periphery of the stator core-member 3, at each end of the machine. Each shield 26 fits tightly enough to act as a seal against the dirt of the surrounding atmosphere, but without having the rigidity or tightness necessary to center the bearing 15, this bearing-centering being maintained by the brackets 11', and not by the protective shields 26, at each end of the machine.

In general, the protective shields 26 will run considerably cooler than the stator-core 3, and this circumstance is desirable, because it will result in a better cooling of the stator end-turns 5. It is desirable, therefore, that a heat-insulating gasket 27 be interposed between the rims of the protective shields 26 and the stator-core 3.

In operation, the form of embodiment of my invention shown in Fig. 2 retains the same mechanical advantages of the bore-centered bearing-supporting brackets 11', which have already been described in connection with Fig. 1, while utilizing an essentially standard or conventional cooling-method for withdrawing the heat from the primary windings of the motor.

While I have illustrated and described my invention in connection with two possible forms of embodiment thereof, I wish it to be understood that I am not altogether limited to the details of construction and arrangement which have been chosen for illustrative purposes. I desire, therefore, that the appended claims shall be accorded the broadest construction consistent with their language.

I claim as my invention:

1. A dynamo-electric machine comprising: a stator core-member having a cylindrical airgap-bore and stator-windings having end-turns extending out of each end of the stator core-member in closely spaced relation to the bore; a rotor-member rotatably mounted within the stator-bore, said rotor-member including a shaft; and a machine-enclosing, imperforate, bracket disposed at each end of the machine, each bracket having a continuous, substantially airtight engagement with its end of the stator core-member adjacent to the airgap-bore, so as to enclose the airgap and the rotor-member but not the stator-windings, and each bracket further carrying a centrally disposed shaft-supporting bearing.

2. A dynamo-electric machine comprising: a stator core-member having a cylindrical air-gap-bore and stator-windings having end-turns extending out of each end of the stator core-member in closely spaced relation to the bore; a rotor-member rotatably mounted within the stator-bore, said rotor-member including a shaft; the stator core-member having a sufficient axial length to extend axially beyond the airgap portion of the rotor-member at each end of the machine; and a bore-centered shaft-supporting bearing-bracket at each end of the machine, each bracket having an inwardly extending, peripherally disposed structural-means having a centering abutment with its end of the stator-bore, and an axial-displacement-preventing abutment with its end of the stator core-member, between said bore and the stator end-turns at its end of the machine, and each bracket further carrying a centrally disposed shaft-supporting bearing.

3. The invention as defined in claim 1, characterized by the stator end-turns at each end of the machine having a protective encapsulating casing which is substantially limited to the surface-extent of said stator end-turns and which tightly encloses said stator end-turns.

4. The invention as defined in claim 2, characterized by the stator end-turns at each end of the machine having a protective encapsulating casing which is substantially limited to the surface-extent of said stator end-turns and which tightly encloses said stator end-turns.

5. The invention as defined in claim 1, in combination with a protective shield, providing a sealing enclosure extending from the bearing to the outer periphery of the stator core-member, in spaced relation to the stator end-turns, at each end of the machine; the centering of the bearing being maintained, however, by the bracket and not by the protective shield, at each end of the machine.

6. The invention as defined in claim 2, in combination with a protective shield, providing a sealing enclosure extending from the bearing to the outer periphery of the stator core-member, in spaced relation to the stator end-turns, at each end of the machine; the centering of the bearing being maintained, however, by the bracket and not by the protective shield, at each end of the machine.

7. The invention as defined in claim 1, characterized by the stator member of the machine also including a frame-member supported in spaced relation to at least portions of the outer periphery of the stator core-member; a hoodlike shield disposed over each end of the machine, each shield having ventilating-openings, and each shield having a substantially cylindrically extending peripheral portion in engagement with its end of the frame-member; and a fan carried by the shaft between at least one bracket and the shield at that end of the machine.

8. The invention as defined in claim 2, characterized by the stator member of the machine also including a frame-member supported in spaced relation to at least portions of the outer periphery of the stator core-member; a hoodlike shield disposed over each end of the machine, each shield having ventilating-openings, and each shield having a substantially cylindrically extending peripheral portion in engagement with its end of the frame-member; and a fan carried by the shaft between at least one bracket and the shield at that end of the machine.

LEON R. LUDWIG.

REFERENCES CITED

The following references are of record in the file of this patent:

UNITED STATES PATENTS

| Number | Name | Date |
| --- | --- | --- |
| 1,605,571 | Sperry | Nov. 2, 1926 |
| 1,794,618 | Howe | Mar. 3, 1931 |
| 1,876,767 | Selden | Sept. 13, 1932 |
| 1,908,620 | Zorzi | May 9, 1933 |
| 2,100,020 | Andrews | Nov. 23, 1937 |